United States Patent
Kakuta

(10) Patent No.: US 10,140,731 B2
(45) Date of Patent: Nov. 27, 2018

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Hitoshi Kakuta, Abiko (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/949,068

(22) Filed: Nov. 23, 2015

(65) Prior Publication Data

US 2016/0155244 A1 Jun. 2, 2016

(30) Foreign Application Priority Data

Nov. 27, 2014 (JP) ................. 2014-239853

(51) Int. Cl.
*G06K 9/00* (2006.01)
*G06T 11/00* (2006.01)
(Continued)

(52) U.S. Cl.
CPC .............. *G06T 11/001* (2013.01); *G06K 9/38* (2013.01); *G06T 5/003* (2013.01); *G06T 5/008* (2013.01);
(Continued)

(58) Field of Classification Search
CPC ......... G06T 11/001; G06T 2207/10024; G06T 2207/20148; G06T 2207/20192;
(Continued)

(56) References Cited

U.S. PATENT DOCUMENTS 5,329,385 A * 7/1994 Washio ............... H04N 1/6022
358/501
5,712,924 A 1/1998 Fujimoto et al.
(Continued)

FOREIGN PATENT DOCUMENTS

CN 101094306 A 12/2007
EP 0711066 A2 5/1996
(Continued)

OTHER PUBLICATIONS

Extended European Search Report issued in European Appln. No. 15193121.9 mailed Jun. 1, 2016.
(Continued)

*Primary Examiner* — Jayesh A Patel
(74) *Attorney, Agent, or Firm* — Rossi, Kimms & McDowell LLP

(57) ABSTRACT

An image processing apparatus that monochromatizes a gray pixel included in bitmap image data into black pixel includes: a detection unit configured to detect, in the case where a pixel of interest in the image data is a pixel constituting an edge, a pixel that exists in the vicinity of the pixel of interest and whose color is different from that of the pixel of interest; and a determination unit configured to determine a ratio of the processing to monochromatize into black for the pixel of interest that is a pixel constituting the edge based on the distance from the detected different color pixel.

10 Claims, 12 Drawing Sheets

(51) Int. Cl.
*G06K 9/38* (2006.01)
*G06T 5/00* (2006.01)
*G06T 7/13* (2017.01)
*G06T 7/136* (2017.01)

(52) U.S. Cl.
CPC ............... *G06T 7/13* (2017.01); *G06T 7/136* (2017.01); *G06T 2207/10024* (2013.01); *G06T 2207/20192* (2013.01)

(58) Field of Classification Search
CPC ....... G06T 5/003; G06T 5/008; G06T 7/0085; G06T 7/13; G06T 7/136; G06K 9/38
USPC .................................................. 382/162, 167
See application file for complete search history.

(56) References Cited

U.S. PATENT DOCUMENTS

| | | | | |
|---|---|---|---|---|
| 5,771,107 | A * | 6/1998 | Fujimoto | H04N 1/58 358/453 |
| 5,992,971 | A * | 11/1999 | Takahashi | B41J 2/2107 347/14 |
| 6,064,761 | A * | 5/2000 | Metcalfe | G06K 9/00 358/518 |
| 6,323,959 | B1 * | 11/2001 | Toyama | H04N 1/482 358/518 |
| 6,600,832 | B1 * | 7/2003 | Nakayama | H04N 1/56 358/462 |
| 6,864,995 | B2 * | 3/2005 | Nogiwa | G06K 15/02 347/19 |
| 6,879,417 | B1 * | 4/2005 | Tabata | H04N 1/6022 358/1.16 |
| 6,980,327 | B2 * | 12/2005 | Yamamoto | H04N 1/6022 358/1.9 |
| 7,050,627 | B2 * | 5/2006 | Cuciurean-Zapan | H04N 1/6022 358/520 |
| 7,079,685 | B1 * | 7/2006 | Hirota | H04N 1/58 382/167 |
| 7,190,487 | B2 * | 3/2007 | Dalrymple | G06K 15/02 345/601 |
| 7,199,900 | B2 * | 4/2007 | Ogatsu | B41F 27/1206 358/1.9 |
| 7,570,824 | B2 * | 8/2009 | Katougi | H04N 1/4052 382/162 |
| 7,679,780 | B2 * | 3/2010 | Ichitani | H04N 1/6025 345/600 |
| 7,697,163 | B2 * | 4/2010 | Yokochi | H04N 1/58 358/1.9 |
| 7,751,082 | B2 * | 7/2010 | Otake | G03G 15/0115 358/1.9 |
| 7,903,872 | B2 | 3/2011 | Matsuzaki | |
| 8,305,645 | B2 * | 11/2012 | Gotoh | H04N 1/6022 358/1.9 |
| 8,335,015 | B2 * | 12/2012 | Klassen | H04N 1/6025 358/1.9 |
| 8,422,103 | B2 * | 4/2013 | Qiao | H04N 1/6022 358/1.9 |
| 9,189,714 | B2 * | 11/2015 | Eguchi | G06K 15/1872 |
| 9,286,661 | B2 * | 3/2016 | Hashimoto | G06K 9/38 |
| 2006/0055948 | A1 * | 3/2006 | Ozaki | B41F 33/0045 358/1.9 |
| 2009/0009779 | A1 | 1/2009 | Do | |
| 2010/0259775 | A1 * | 10/2010 | Sakamoto | H04N 1/58 358/1.9 |
| 2013/0021624 | A1 | 1/2013 | Misaizu et al. | |
| 2015/0332115 | A1 | 11/2015 | Kakuta | |

FOREIGN PATENT DOCUMENTS

| | | |
|---|---|---|
| JP | 2002232704 A | 8/2002 |
| JP | 2008205967 A | 9/2008 |
| JP | 2014-100846 | 6/2014 |
| JP | 2015-220506 A | 12/2015 |

OTHER PUBLICATIONS

English specification and drawings for 10139230US01 "Image Processing Apparatus, Image Processing Method, and Storage Medium" which is the U.S Application claiming priority to JP2014-100846.
Office Action issued in Chinese Appln. No. 201510849988.3 dated Dec. 5, 2017. English translation provided.
Office Action issued in Japanese Appln No. 2014-239853 dated Jul. 24, 2018.
Office Action issued in Chinese Appln. No. 201510849988.3 dated Sep. 19, 2018. English Translation provided.

* cited by examiner

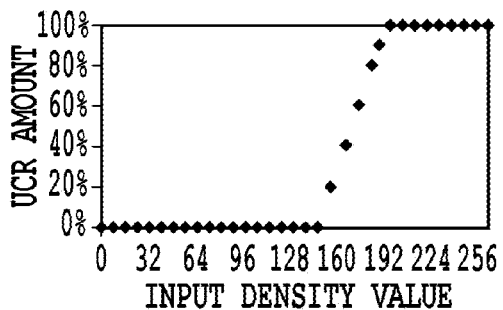
FIG.3A
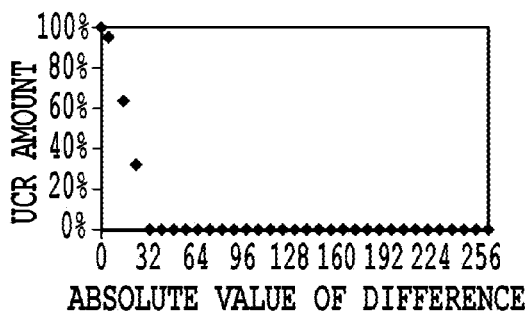
FIG.3B
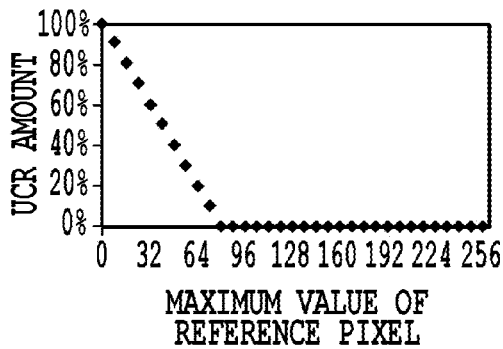
FIG.3C
|   | X COORDINATE | | | | | | | | |
|---|---|---|---|---|---|---|---|---|---|
|   | -4 | -3 | -2 | -1 | 0 | 1 | 2 | 3 | 4 |
| -4 | 0% | 0% | 18% | 29% | 33% | 29% | 18% | 0% | 0% |
| -3 | 0% | 25% | 46% | 61% | 66% | 61% | 46% | 25% | 0% |
| -2 | 18% | 46% | 72% | 92% | 100% | 92% | 72% | 46% | 18% |
| -1 | 29% | 61% | 92% | 100% | 100% | 100% | 92% | 61% | 29% |
| 0 | 33% | 66% | 100% | 100% | 100% | 100% | 100% | 66% | 33% |
| 1 | 29% | 61% | 92% | 100% | 100% | 100% | 92% | 61% | 29% |
| 2 | 18% | 46% | 72% | 92% | 100% | 92% | 72% | 46% | 18% |
| 3 | 0% | 25% | 46% | 61% | 66% | 61% | 46% | 25% | 0% |
| 4 | 0% | 0% | 18% | 29% | 33% | 29% | 18% | 0% | 0% |
(Y COORDINATE on left axis)
FIG.3D
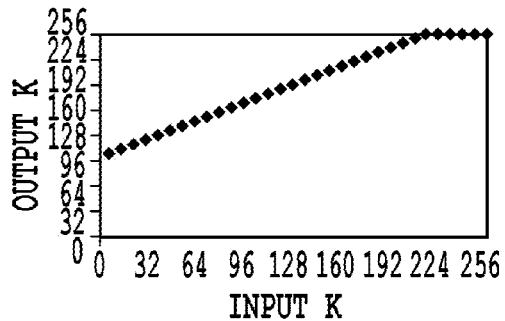
FIG.3E
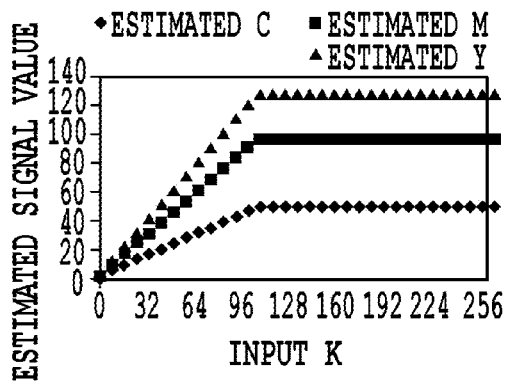
FIG.3F

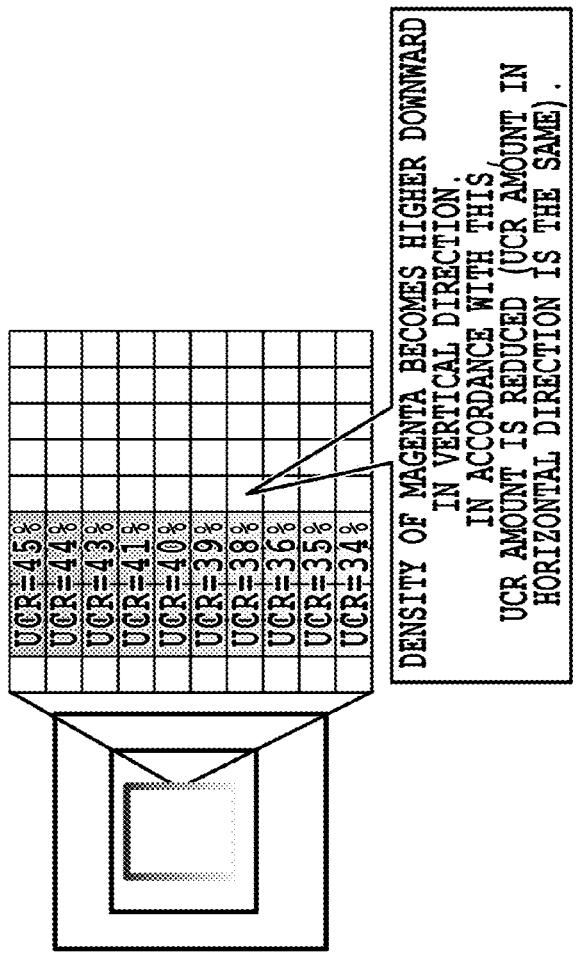
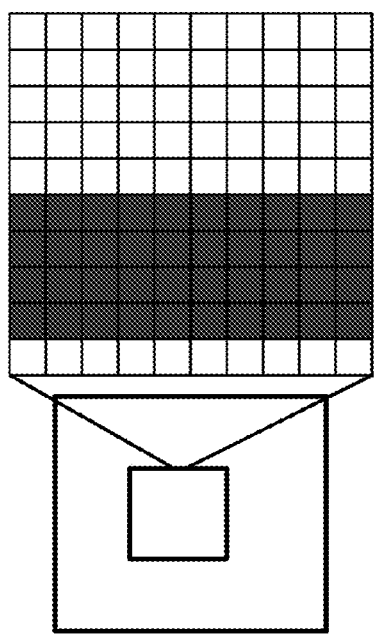
FIG.9B
FIG.9A

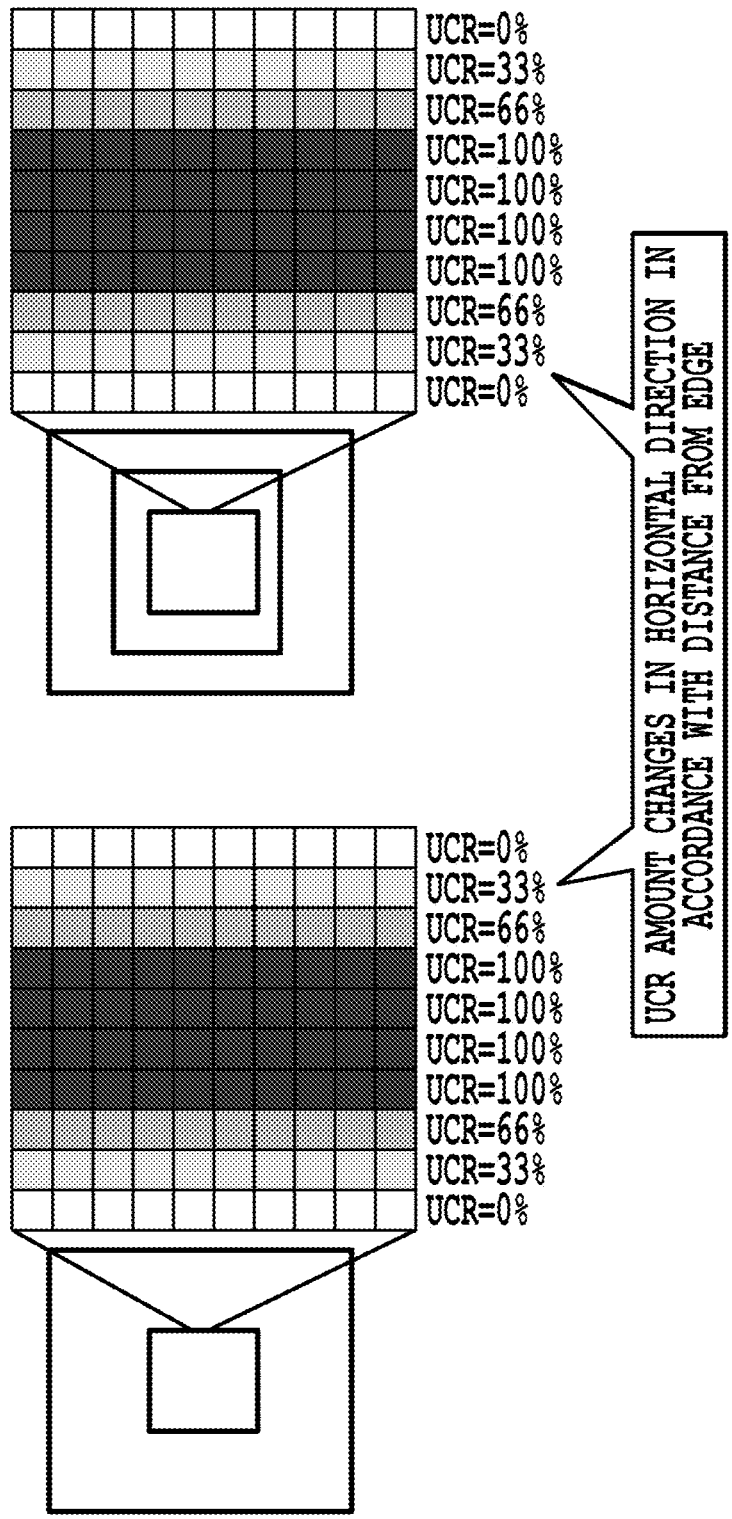

IMAGE PROCESSING APPARATUS, IMAGE PROCESSING METHOD, AND STORAGE MEDIUM

BACKGROUND OF THE INVENTION

Field of the Invention

The present invention relates to an image processing apparatus, an image processing method, and a storage medium.

Description of the Related Art

Conventionally, there is a technique (monochromatization into black) to detect a gray character from bitmap image data sent from a PC or the like, and to convert the detected gray character into a character represented only in black (K value) (e.g., Japanese Patent Application No. 2014-100846). Specifically, monochromatization into black is performed in such a procedure as below.

1) Attention is focused on each pixel of bitmap image data and a window (predetermined area) with the pixel of interest as a center is set.

2) In the case where the number of pixels whose color is the same as that of the pixel of interest is large, the number of pixels in a similar color is small, and the number of pixels in different colors is large in the set window, the pixel of interest is determined to be a pixel belonging to a "character".

3) Then, in the case where the pixel of interest determined to belong to a "character" is gray (R=G=B), the pixel of interest is determined to be a pixel belonging to a "gray character" and the pixel is monochromatized into black.

Japanese Patent Application No. 2014-100846 is a document that is not disclosed, and therefore, to be strict, it is not possible to call the technique the prior art, but the technique described in Japanese Patent Application No. 2014-100846 is the technique closest to the technique of the present invention, and therefore, the technique is explained as the prior art.

In the case where each pixel constituting a gray character included in bitmap image data is analyzed by making use of the technique of Japanese Patent Application No. 2014-100846 described above, a pixel determined to "belong" to the gray character and a pixel determined to "not belong" to the gray character are included therein as a result. In other words, a pixel located on the end (edge) of the gray character is determined to belong to the gray character and a pixel located at the center (non-edge) of the gray character is determined to not belong to the gray character.

As described above, such a situation is brought about in which some pixels, which are located in the positions up to a certain position, of the pixels constituting the gray character are determined to belong to the gray character, but the next and subsequent pixels are determined to not belong to the gray character. As a result of this, a pixel on which processing to monochromatize into black is to be performed and a pixel on which the processing is not performed are adjacent to each other despite the fact that both pixels constitute the same gray character, and therefore, the boundary (difference in step) becomes conspicuous and the image quality will deteriorate.

SUMMARY OF THE INVENTION

An image processing apparatus according to the present invention is an image processing apparatus that monochromatizes a gray pixel included in bitmap image data into black pixel, and has: a detection unit configured to, in the case where a pixel of interest in the image data is a pixel constituting an edge, detect a pixel that exists in the vicinity of the pixel of interest and whose color is different from that of the pixel of interest; and a determination unit configured to determine a ratio of the processing to monochromatize into black for the pixel of interest that is the pixel constituting the edge based on the distance from the detected different color pixel.

Further features of the present invention will become apparent from the following description of exemplary embodiments (with reference to the attached drawings).

BRIEF DESCRIPTION OF THE DRAWINGS

FIGS. 3A to 3F are diagrams each showing an example of an LUT for determining a UCR amount under various conditions;

FIGS. 9A and 9B are diagrams each showing a UCR amount in accordance with the density of a reference pixel;

FIGS. 10A and 10B are diagrams each showing a UCR amount in accordance with the distance from a reference pixel;

DESCRIPTION OF THE EMBODIMENTS

In the following, with reference to the drawings, the present invention is explained in detail in accordance with preferred embodiments. Configurations shown in the following embodiments are merely exemplary and the present invention is not limited to the configurations shown schematically.

First Embodiment

In the following embodiment, as a reference pixel, a pixel whose color is different from that of a pixel of interest (hereinafter, different color pixel) is detected from pixels in the vicinity of the pixel of interest in the outward direction, and in accordance with the distance from the detected different color pixel, the degree in which processing to monochromatize into black is performed in determined. By doing so, stepwise UCR processing in which a difference in step is inconspicuous is implemented.

Figure 1:
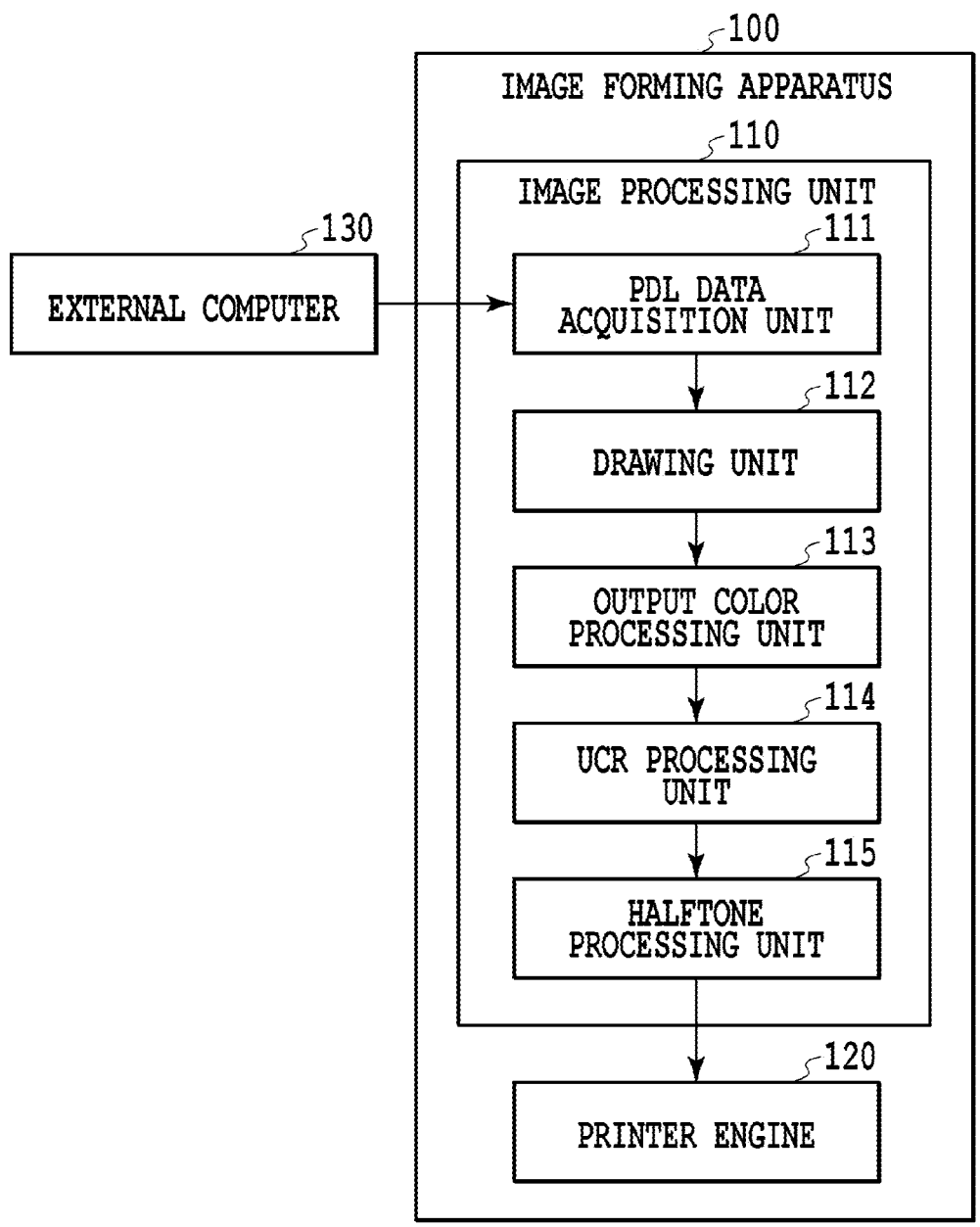
FIG. 1 is a function block diagram showing an example of a configuration of an image forming apparatus that forms an image on a printing medium by the electrophotographic method.

FIG. 1 is a function block diagram showing an example of a configuration of an image forming apparatus that forms an image on a printing medium by the electrophotographic method according to the present embodiment.

An image forming apparatus 100 includes an image processing unit 110 and a printer engine 120. Then, the image processing unit 110 includes a PDL data acquisition unit 111, a drawing unit 112, an output color processing unit 113, a UCR processing unit 114, and a halftone processing unit 115. Further, the image forming apparatus 100 has a control unit, not shown, having a CPU, a ROM, and a RAM and the processing in each unit described above is performed by the CPU loading a predetermined program from the ROM and executing the program by making use of the RAM as a primary storage area. In the following, each unit constituting the image forming apparatus 100 is explained.

The PDL data acquisition unit 111 acquires data (hereinafter, PDL data) described in PDL (Page Description Language) from an external computer 130 connected via a network, such as a LAN. The PDL data is data including drawing commands of an object. The PDL data acquired from the external computer 130 is sent to the drawing unit 112.

The drawing unit 112 interprets the PDL data received from the PDL data acquisition unit 111 and generates a bitmap drawing image (here, assumed to be image data in the RGB color space). The generated bitmap image data is sent to the output color processing unit 113. The output color processing unit 113 generates image data in the CMYK color space by performing color processing on the image data in the RGB color space received from the drawing unit 112. For the color processing, for example, a color processing table that specifies output CMYK values corresponding to input RGB values is used. In designing the color processing table, as a method for reproducing a gray pixel (pixel with R=G=B), a method for reproducing using only toner of K and a method for reproducing using toner of CMYK can be considered. In the present embodiment, it is assumed that the color processing table is designed so that reproduction is carried out using the latter (toner of CMYK). The generated CMYK image data is sent to the UCR processing unit 114.

The UCR processing unit 114 performs UCR (Under Color Removal) processing as the processing to monochromatize into black on the CMYK image data received from the output color processing unit 113. Specifically, first, an edge pixel is detected from the CMYK image data. Then, for the detected edge pixel, a ratio (UCR amount) in which the processing to monochromatize into black is performed for each of a plurality of conditions is derived, the final UCR amount is determined based on each UCR amount that is derived, and the UCR processing is performed on the edge pixel. The CMYK image data on which the UCR processing has been performed is sent to the halftone processing unit 115.

The halftone processing unit 115 converts a multivalued CMYK image received from the UCR processing unit 104 into a binary CMYK image that can be made use of by the printer engine 120. The CMYK image data having been converted into binary data is sent to the printer engine 120.

The printer engine 120 forms an image by using each color material (here, toner) of CMYK on a printing medium, such as paper, based on the binary CMYK image data received from the halftone processing unit 105.

The image processing unit 110 in the present embodiment is one of the components of the image forming apparatus 100, but it is also possible to constitute the image processing unit 110 as an apparatus independent of the image forming apparatus (image processing apparatus including no printer engine).

<Details of Processing to Monochromatize into Black (UCR Processing)>

Figure 2:
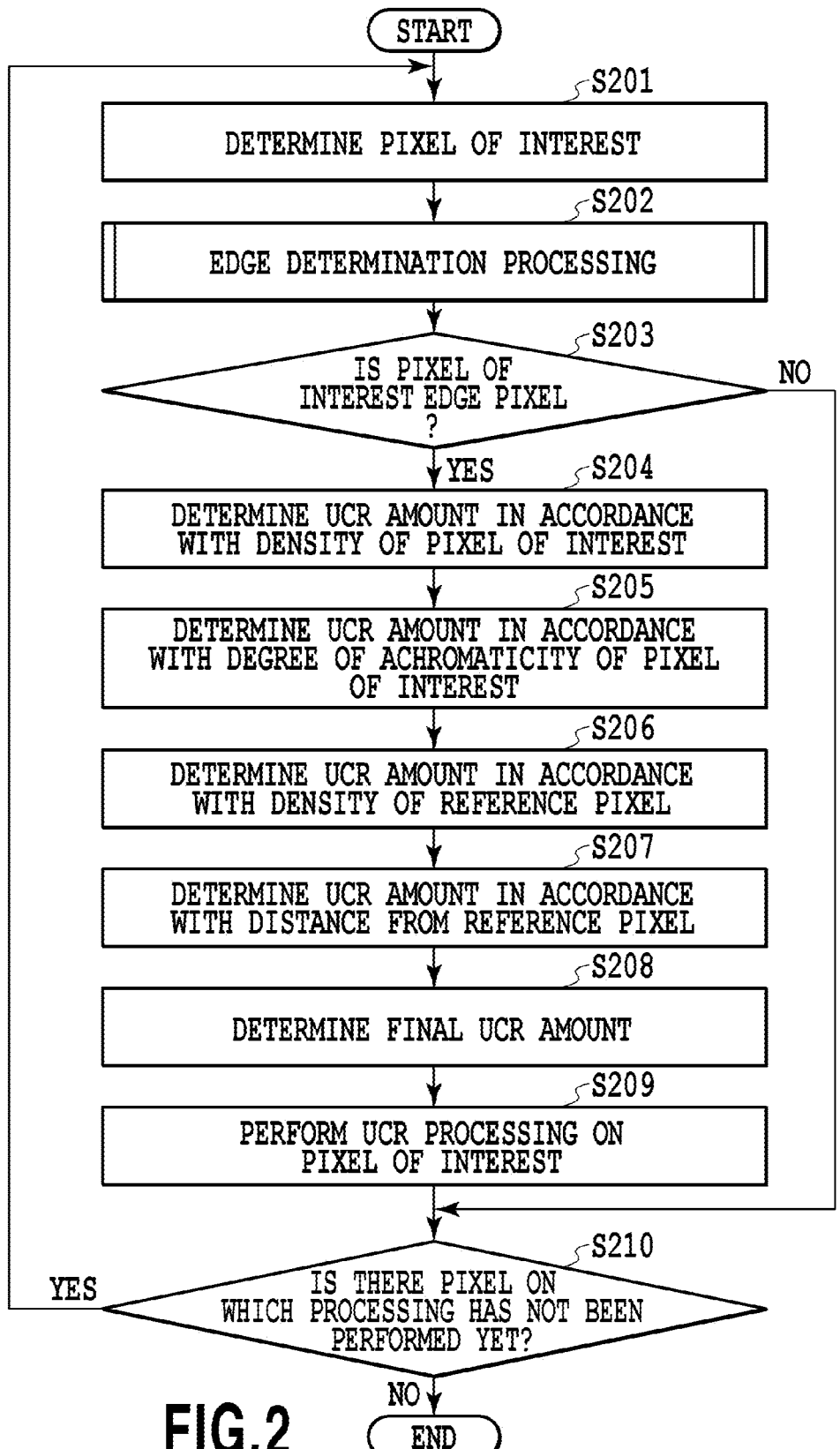
FIG. 2 is a flowchart showing a flow of UCR processing.

Next, details of the UCR processing that is performed by the UCR processing unit 114 are explained. FIG. 2 is a flowchart showing a flow of the UCR processing.

At step 201, the UCR processing unit 114 determines the pixel of interest in the CMYK image data received from the output color processing unit 113. It may be possible to determine the pixel of interest by, for example, selecting each pixel within the CMYK image one by one in the order from the top-left pixel.

At step 202, the UCR processing unit 114 performs edge determination processing on the determined pixel of interest (details of the edge determination processing will be described later). In the case where the pixel of interest is determined to be an edge pixel by the edge determination processing, the information on the pixel position of the reference pixel (reference pixel position information) is acquired. Here, the reference pixel refers to a pixel that exists in the position closest to the pixel of interest and whose color is different from that of the pixel of interest (different color pixel). In this case, for example, it may be possible to determine a degree of vicinity in accordance with the distance from the pixel of interest in such a manner that the degree of vicinity of the eight pixels on the periphery of the central pixel is determined to be 1 and the degree of vicinity of the 16 pixels on the periphery of the eight pixels is determined to be 2, and to determine a pixel whose value is the smallest to be the pixel in the closest position. Then, in the case where there exists a plurality of different color pixels located in the closest position, it may be possible to determine the pixel that is detected first to be the reference pixel.

At step 203, the UCR processing unit 114 determines whether the pixel of interest has been determined to be an edge pixel by the edge determination processing. In the case where the pixel of interest has been determined to be an edge pixel, the processing proceeds to step 204. On the other hand, in the case where it has been determined that the pixel of interest is not an edge pixel, the processing proceeds to step 210.

At step 204, the UCR processing unit 114 determines a UCR amount (rate0) in accordance with the density of the pixel of interest. For this determination, for example, it is possible to use a lookup table (hereinafter, LUT) in which each density value of K in the input CMYK image and the UCR amount (rate0) are associated with each other. FIG. 3A is an example of an LUT that is used at the time of determining the UCR amount (rate0) in accordance with the density of the pixel of interest. From the LUT in FIG. 3A, it is known that the UCR amount is "0% until the density value as the input value reaches "144", the UCR amount (rate0) increases linearly up to "100%" while the density value of K is between "144 and 192", and the UCR amount (rate0) is kept at "100%" after the density value has reached "192". It may be possible to prepare only one LUT common to CMYK, or to prepare an individual LUT for each color of CMYK.

At step 205, the UCR processing unit 114 determines a UCR amount (rate1) in accordance with the saturation (degree of achromaticity) of the pixel of interest. For this determination, for example, it is possible to use an LUT in which a difference (absolute value) between the maximum value and the minimum value of CMY in the input CMYK image and the UCR amount (rate1) are associated with each other. FIG. 3B is an example of an LUT that is used at the time of determining the UCR amount (rate1) in accordance with the degree of achromaticity. From the LUT in FIG. 3B, it is known that the UCR amount (rate1) decreases linearly from "100% to 0%" until the absolute value of the difference as the input value reaches "32" and after the absolute value of the difference has reached "32", the UCR amount (rate1) is kept at "0%".

At step 206, the UCR processing unit 114 determines a UCR amount (rate2) in accordance with the density of the reference pixel that is specified by the above-described reference pixel position information. For this determination, for example, it is possible to use an LUT in which each input density value of the reference pixel (maximum value of each value of CMYK) and the UCR amount (rate2) are associated with each other. FIG. 3C is an example of an LUT that is used at the time of determining the UCR amount (rate2) in accordance with the density of the reference pixel. From the LUT in FIG. 3C, it is known that the UCR amount (rate2) decreases linearly from "100% to 0%" until the density value (maximum value) of the reference pixel as the input value reaches "80" and after the maximum value of the reference pixel has reached "80", the UCR amount (rate2) is kept at "0%".

At step 207, the UCR processing unit 114 determines a UCR amount (rate3) in accordance with the distance from the reference pixel that is specified by the above-described reference pixel position information. For this determination, for example, it is possible to use an LUT in which each coordinate representing the pixel position and the UCR amount (rate3) are associated with each other. FIG. 3D is an example of an LUT that is used at the time of determining the UCR amount (rate3) in accordance with the distance from the reference pixel. In the LUT in FIG. 3D, it is known that the UCR amount (rate3) in accordance with the distance value is specified in the case where the distance values of the X coordinate and the Y coordinate are within ±4 (the larger the value, the greater the distance), and that the UCR amount (rate3) becomes smaller concentrically as the distance value becomes larger.

At step 208, the UCR processing unit 114 determines a final UCR amount (rateF) that is applied to the pixel of interest. Specifically, of the three UCR amounts (rate0, rate1, rate2) determined at each of step 204 to step 206 described above, the smallest UCR amount multiplied by the UCR amount (rate3) determined at step 207 is determined to be the final UCR amount (rateF). This is expressed by expression (1) below as follows.

$$rateF=\min(rate0,rate1,rate2)\times rate3 \quad \text{expression (1)}$$

At step 209, the UCR processing unit 114 performs the UCR processing on the pixel of interest by using the final UCR amount (rateF) determined at step 208. Specifically, the UCR processing is performed, for example, as follows. First, the CMYK values (C=M=Y=0, K≥0) in the case where the 100% UCR processing is performed are found. It is possible to find the CMYK values by using, for example, an LUT in which the value of K in the input CMYK image and the value of K at the time of the 100% UCR processing are associated with each other. Then, the input CMYK values and the CMYK values at the time of the 100% UCR processing are used, and by calculating a weighted average using the determined final UCR amount (rateF), the UCR processing for the pixel of interest is completed.

At step 210, the UCR processing unit 114 determines whether all the pixels of the input CMYK image data have been performed as the pixel of interest. In the case where there is a pixel on which the processing has not been performed yet, the processing returns to step 201, and the next pixel is determined to be the pixel of interest and thus the processing is continued. On the other hand, in the case where the processing has been completed for all the pixels, the present processing is terminated.

The above is the contents of the processing to monochromatize into black (UCR processing) in the present embodiment. Due to this, it is made possible to perform the UCR processing on a gray edge pixel while reducing white spots in the case where pixels in a dark color exist around the gray edge pixel.

<Details of Edge Determination Processing>

Figure 4:
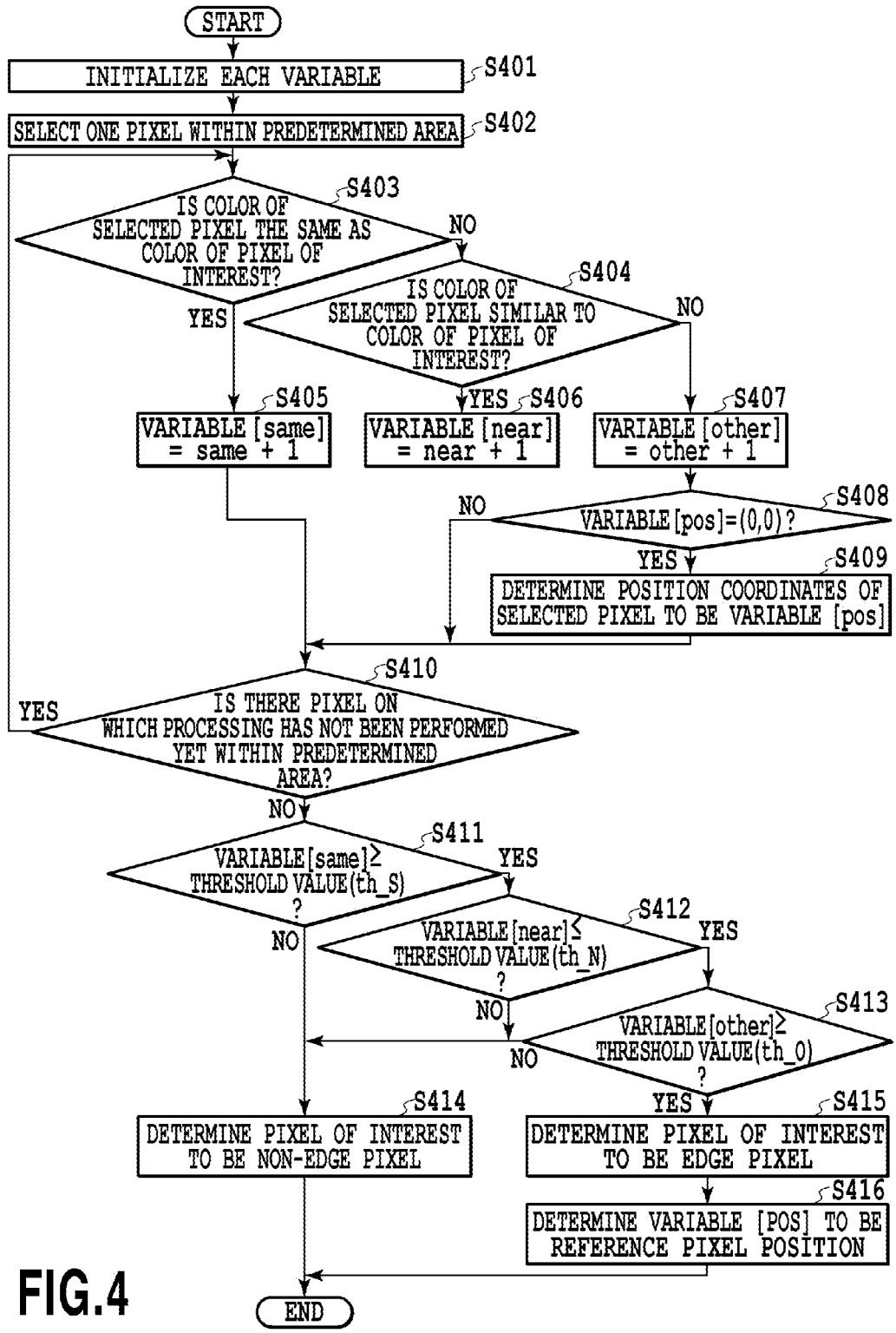
FIG. 4 is a flowchart showing details of edge determination processing.

Subsequently, the above-described edge determination processing at step 202 is explained in detail. FIG. 4 is a flowchart showing details of the edge determination processing in the present embodiment.

At step 401, a variable [same] for counting the number of pixels in the same color, a variable [near] for counting the number of pixels in a similar color, a variable [other] for counting the number of pixels in a different color, and a variable [pos] indicating the reference pixel position are initialized. Specifically, for each variable of the number of pixels in the same color [same], the number of pixels in a similar color [near], and the number of pixels in a different color [other], "0" is set. Then, for the reference pixel position [pos], the center coordinates (0, 0) of a predetermined processing area (in the present embodiment, a range of 9×9 pixels with the pixel of interest as a center) are set.

At step 402, the pixels within the above-described processing area are selected one by one in the order from the pixel close to the center of the processing area. The selection order is arbitrary, and for example, it may be possible to select the eight pixels whose degree of vicinity described above is 1 (positions adjacent to the center in the vertical, horizontal, and diagonal directions) in the order from the top-left pixel one by one in the clockwise direction and after all the pixels whose degree of vicinity is 1 are selected, to select the 16 pixels whose degree of vicinity is 2 (positions two pixels apart from the center in the vertical, horizontal, and diagonal directions) one by one. Alternatively, it may also be possible to select the pixels in such a manner that the four pixels closest to the center (positions adjacent to the center in the vertical and horizontal directions) are selected one by one in the order from, for example, the upper pixel in the clockwise direction and after all the four closest pixels are selected, the four pixels the second closest to the center (adjacent to the center in the diagonal directions) are selected one by one. Further, it may also be possible to select the pixels in the order from the pixel whose UCR amount in the LUT shown in FIG. 3D is the largest. By the methods as described above, the pixels are selected one by one from the inside of the processing area.

At step 403, whether or not the color of the pixel selected at step 402 is the same color as that of the pixel of interest is determined. The concept of "the same" here is a concept including the case where the difference in color from the pixel of interest (in this example, the difference in the CMYK values) is, for example, less than a predetermined threshold value, in addition to the case where the color is perfectly the same. The predetermined threshold value here is assumed to be a "threshold value A". In the case where the results of the determination indicate that the colors are not the same, the processing proceeds to step 404. On the other hand, in the case where it is determined that the colors are the same, the processing proceeds to step 405.

At step 404, whether or not the color of the pixel selected at step 402 is similar to the color of the pixel of interest is determined. Here, the case where the color is "similar"

means the case where the difference in color from the pixel of interest is, for example, not less than the threshold value A and less than another predetermined threshold value greater than the threshold value A. Here, the other predetermined threshold value different from the threshold value A is assumed to be a "threshold value B" (threshold value A<threshold value B). Then, the pixel whose difference in color from the pixel of interest is equal to or more than the threshold value B is a pixel whose color is different, neither the color is the same nor the color is similar. In the case where the results of the determination indicate that the color is similar, the processing proceeds to step 406. On the other hand, in the case where it is determined that the color is not similar (the color is a different color), the processing proceeds to step 407.

Here, the threshold value A and the threshold value B described above are explained. In the case where the CMYK values of each pixel are represented by eight bits (256 tone levels) and as the difference in color, the maximum value of ΔC, ΔM, ΔY, and ΔK is used, preferably, the value of the threshold value A is about "16" and the value of the threshold value B is about "64". However, it is not possible to unconditionally determine which value is preferable because the appropriate threshold value differs depending on the precondition, such as the color conversion method (for example, by which calculation expression, RGB is converted into CMYK) in the output color processing unit 113. For example, in the case where noise at a certain level is expected in an image, it is preferable to set the value of the threshold value A to about "40" and the value of the threshold value B to about "128". It is sufficient to determine which value should be set to the threshold value A and the threshold value B, respectively, by a user (designer) conducting an experiment or the like with the characteristics of an image on which processing is to be performed in mind. In this case, in order to determine an appropriate threshold value, for example, it is recommended to make adjustment while checking whether or not an edge is detected successfully with the value "16" of the threshold value A and the value "64" of the threshold value B described above being taken to be the starting point. The reason that "2" or more is preferable as the value of the threshold value A for determining whether the color is the same is that an irreversible compression method is supposed as a compression method of image data. In the function units each shown in FIG. 1, a function unit that performs compression processing is not included, but a system can be considered in which each piece of the processing "compression, saving, decompression" is inserted between the drawing unit 112 and the output color processing unit 113. In the case where such compression/decompression processing is performed, there is a possibility that a subtle variation will occur in the color of a character or line that should be originally configured by pixels whose color is perfectly equal (perfectly the same color). In order to absorb such a variation, it is preferable to set a value greater than "1" as the threshold value A. In the example described above, the difference in color is taken to be the maximum value of the difference (ΔC, ΔM, ΔY, ΔK) for each color component of the CMYK values of the pixel of interest and the CMYK values of the selected pixel. However, the difference in color is not limited to this and any value can be used as long as it can represent the difference in color. For example, it may also be possible to use the sum or the mean square sum of ΔC, ΔM, ΔY, and ΔK.

Explanation is returned to the flowchart in FIG. 4

At step 405, the variable [same] for counting the number of pixels whose color is the same is incremented (+1).

At step 406, the variable [near] for counting the number of pixels whose color is similar is incremented (+1).

At step 407, the variable [other] for counting the number of pixels whose color is different is incremented (+1).

At step 408, whether the variable [pos] indicating the reference pixel position is still the initial value (0, 0) is determined. In the case where the variable [pos] is (0, 0), the processing proceeds to step 409. On the other hand, in the case where the variable [pos] is not (0, 0), the processing proceeds to step 410.

At step 409, the coordinates of the position of the selected pixel with the center (0, 0) of the predetermined area as a reference are set to (substituted for) the variable [pos].

At step 410, whether all the pixels within the predetermined area have been selected is determined. In the case where there is a pixel on which the processing has not been performed yet, the processing returns to step 402, and the next pixel is selected and thus the processing is continued. On the other hand, in the case where all the pixels have been selected, the processing proceeds to step 411.

After the determination of whether the color is the same, the color is similar, or the color is different is performed for all the pixels within the predetermined area, at step 411, whether the value of the variable [same] is equal to or more than a predetermined threshold value (th_S) is determined. In the case where the value of the variable [same] is equal to or more than the threshold value (th_S), the processing proceeds to step 412. On the other hand, in the case where the value of the variable [same] is less than the threshold value (th_S), the processing proceeds to step 414.

At step 412, whether the value of the variable [near] is equal to or less than a predetermined threshold value (th_N) is determined. In the case where the value of the variable [near] is equal to or less than the threshold value (th_N), the processing proceeds to step 413. On the other hand, in the case where the value of the variable [near] exceeds the threshold value (th_N), the processing proceeds to step 414.

At step 413, whether the value of the variable [other] is equal to or more than a predetermined threshold value (th_O) is determined. In the case where the value of the variable [other] is equal to or more than the threshold value (th_O), the processing proceeds to step 415. On the other hand, in the case where the value of the variable [other] is less than the threshold value (th_O), the processing proceeds to step 414.

Here, the above-described three predetermined threshold values (th_S to th_O) are explained. In the case of the present embodiment where the predetermined area is a window of 9×9 pixels with the pixel of interest as a center, as an example, such values can be considered for the three predetermined threshold values: "4" for the threshold value (th_S), "7" for the threshold value (th_N), and "3" for the threshold value (th_O). As a matter of course, the values are not limited to these values and it may be possible to appropriately set the values by taking into consideration the various conditions. For example, in the case where it is desired to securely detect an edge of a thin solid-white line included in the input image, it is recommended to set the value of the threshold value (th_O) to a smaller value (e.g., "1").

At step 414, it is determined that the pixel of interest is not an edge pixel (non-edge pixel) and the present processing is terminated.

At step 415, it is determined that the pixel of interest is an edge pixel. Then, at step 416 that follows, the contents of the current variable [pos] are set as the reference pixel position for the pixel of interest determined to be an edge pixel and the present processing is terminated.

The above is the contents of the edge determination processing in the present embodiment. By performing such edge determination processing on all the pixels of the CMYK image data received from the output color processing unit 113, the edge pixel in the drawing image and the position of the different color pixel (=reference pixel) that exists in the position closest to each edge pixel are specified.

Next, each piece of the processing (step 204 to step 209) after the edge pixel is specified is explained in detail by using a specific example.

Figure 5B:
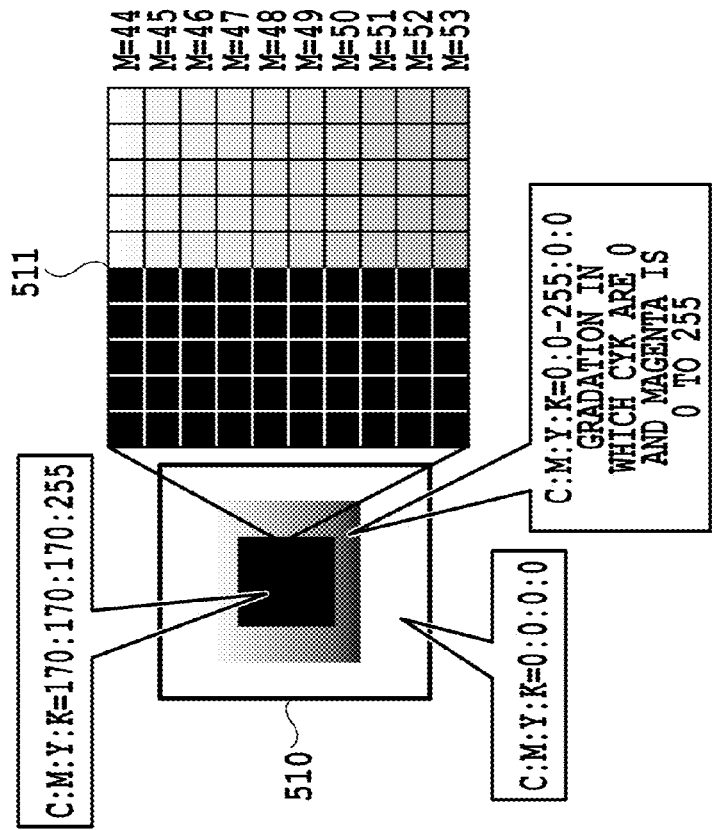
FIGS. 5A and 5B are diagrams each showing an example of an input image (CMYK image)
Figure 5A:
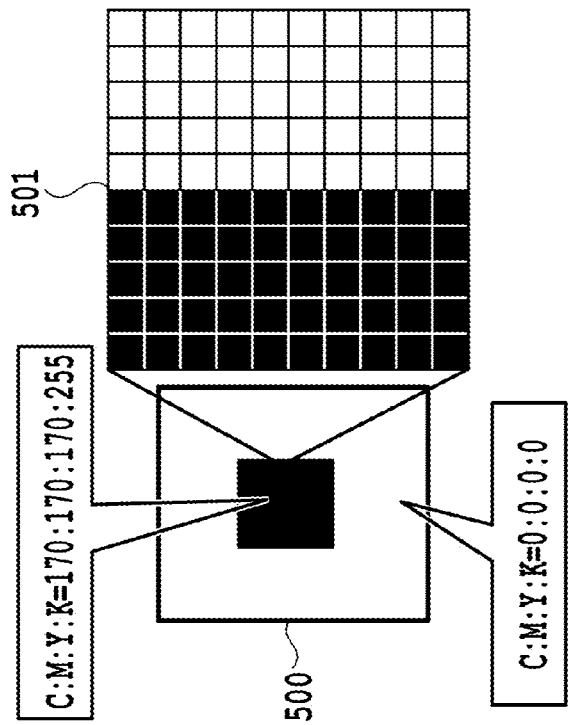

FIGS. 5A and 5B are diagrams each showing an example of an input image (CMYK image) that is a target of processing. In FIG. 5A, a CMYK image 500 in which a black (C:Y:M:K=170:170:170:255) rectangular object is drawn on a white (C:Y:M:K=0:0:0:0) background, and an enlarged view 501 of the edge portion of the black rectangular object are shown. In the enlarged view 501, the left area having a width of five pixels belongs to the black rectangular object and the right area having a width of five pixels belongs to the background. In FIG. 5B, a CMYK image 510 in which a magenta (C:Y:M:K=0:0 to 255:0:0) rectangular object is drawn by gradation on a white background and on the magenta rectangular object, a black rectangular object is drawn, and an enlarged view 511 of the edge portion of the black rectangular object are shown. In the enlarged view 511, the left area having a width of five pixels belongs to the black rectangular object and the right area having a width of five pixels belongs to the magenta rectangular gradation object. Numerical values aligned on the right side of the enlarged view 511 indicate the density value of magenta in the magenta rectangular gradation object (the five pixels put side by side in the row direction have the same density value) and it is known that the density becomes higher in the downward direction.

Figure 6B:
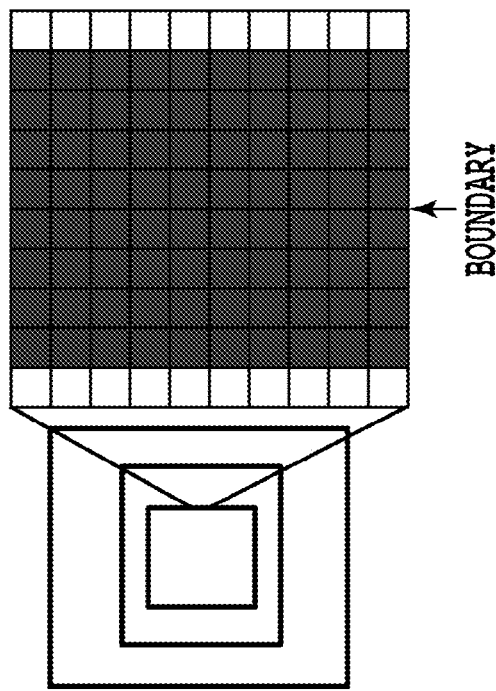
FIGS. 6A and 6B are diagrams each showing an example of the results of the edge determination processing.
Figure 6A:
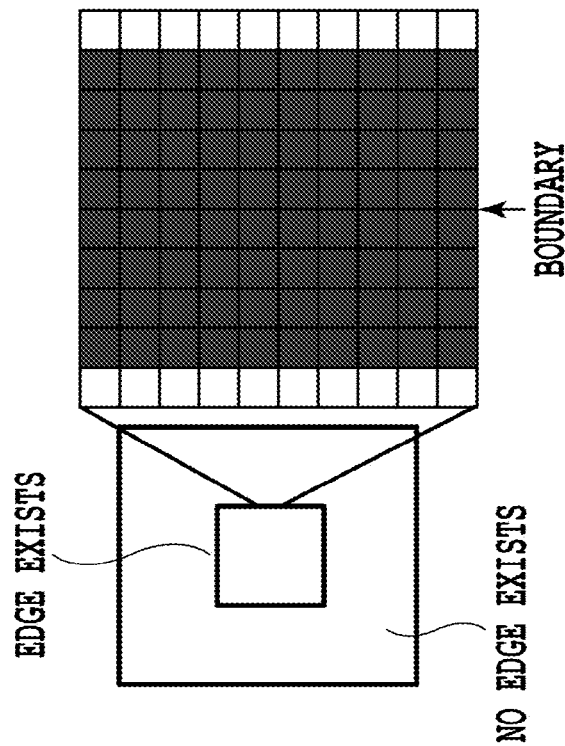

FIGS. 6A and 6B are diagrams each showing the results of performing the above-described edge determination processing (step 202 in the flow in FIG. 4) on each CMYK image shown in FIGS. 5A and 5B. The portion shown in gray is the portion determined to be an edge pixel in the enlarged view 501 and the enlarged view 511. In the present embodiment, the size of the predetermined area in the edge determination processing is assumed to be the range of 9×9 pixels, and therefore, both in FIG. 6A and FIG. 6B, the pixels located in the positions whose distance from the edge boundary is four pixels or less on both the left side and the right side are determined to be the edge pixel. Then, the UCR processing is performed on each pixel determined to be the edge pixel.

Figure 7B:
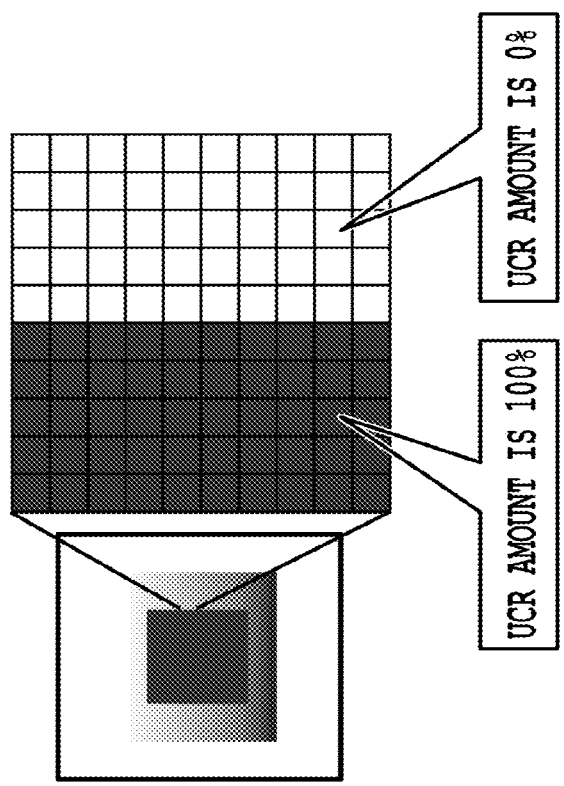
FIGS. 7A and 7B are diagrams each showing a UCR amount in accordance with the density of a pixel of interest.
Figure 7A:
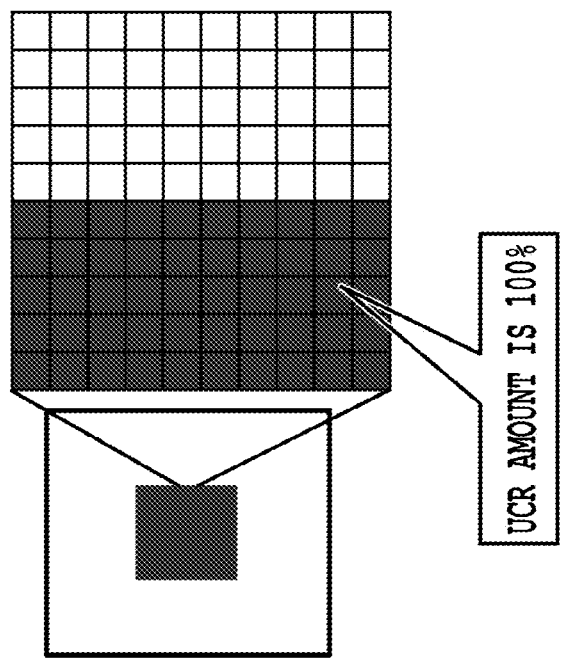

FIGS. 7A and 7B are diagrams each representing the UCR amount in accordance with the density of the pixel of interest in the area in the enlarged view 501 and in the enlarged view 511 shown in FIGS. 5A and 5B, respectively. The dark gray portion indicates that the UCR amount is 100% and the white portion indicates that the UCR amount is 0%. The UCR amount of the white (K=0) background portion and the magenta rectangular gradation object portion is low and the UCR amount of the black (K=255) rectangular object portion is high. The reason that the UCR amount in the right half area in which the magenta rectangular gradation object exists is 0% in the FIG. 7B is that the density is not so high that a UCR amount that exceeds 0% is set (see the LUT in FIG. 3A described previously) although the density of magenta in the portion is not zero (see FIG. 5B described previously).

Figure 8B:
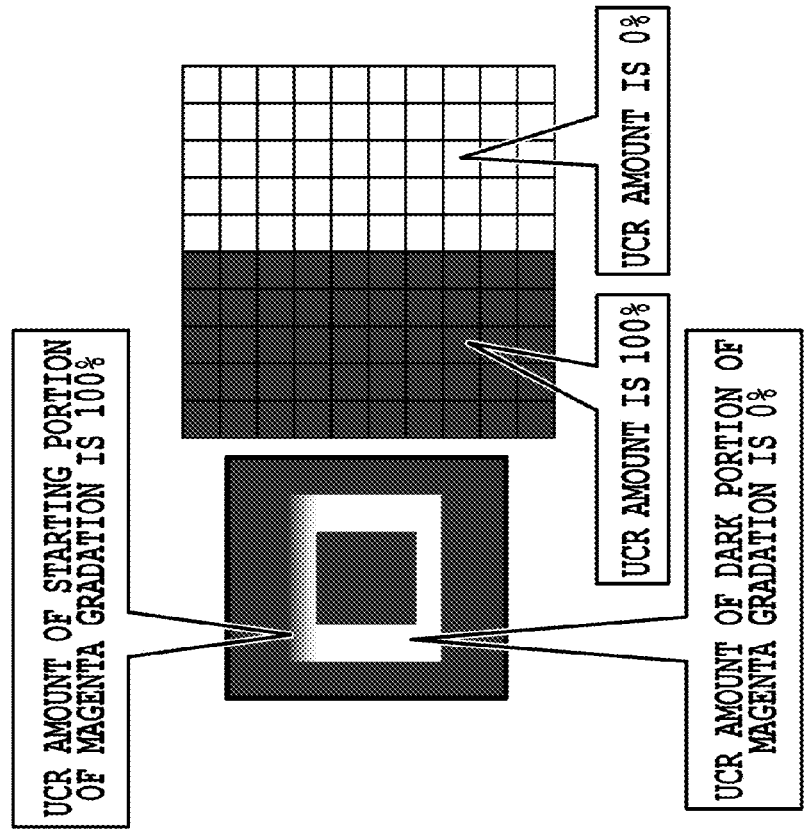
FIGS. 8A and 8B are diagrams each showing a UCR amount in accordance with the saturation (degree of achromaticity) of a pixel of interest.
Figure 8A:
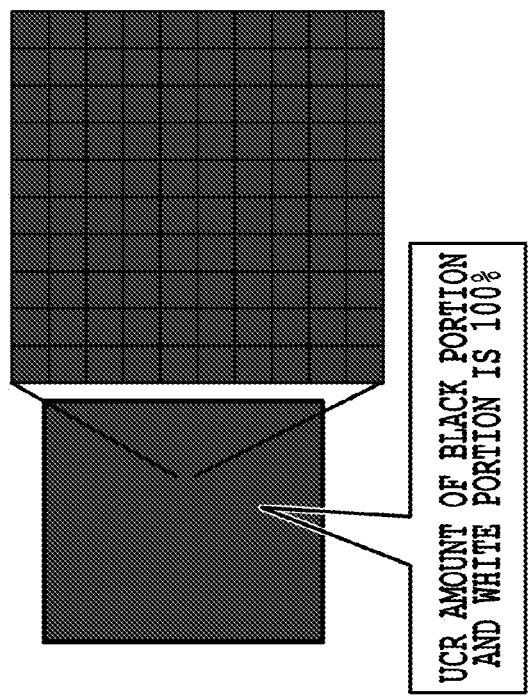

FIGS. 8A and 8B are diagrams each representing the UCR amount in accordance with the saturation (degree of achromaticity) of the pixel of interest in the area in the enlarged view 501 and in the enlarged view 511 shown in FIGS. 5A and 5B, respectively. As in FIGS. 7A and 7B, the dark gray portion indicates that the UCR amount is 100% and the white portion indicates that the UCR amount is 0%. In the magenta (chromatic color) rectangular gradation object, the UCR amount of the starting portion is as high as 100%, but the UCR amount drops soon to 0% and the UCR amount of the dark gradation portion is 0%. On the other hand, the UCR amount of the white (achromatic color) background and the black (achromatic color) rectangular object portions is 100% because there is no difference between the CMY values.

FIGS. 9A and 9B are diagrams each representing the UCR amount in accordance with the density of the reference pixel in the area in the enlarged view 501 and in the enlarged view 511 shown in FIGS. 5A and 5B, respectively. As in FIGS. 7A and 7B and in FIGS. 8A and 8B, the dark gray portion indicates that the UCR amount is 100% and the white portion indicates that the UCR amount is 0%. In FIG. 9B, the UCR amount is the same in the horizontal direction (row direction), which is indicated by the numerical value in FIG. 9B, but in the vertical direction (column direction), the UCR amount changes in the direction opposite to the change in the density of the magenta rectangular gradation object (the higher the reference density, the lower the UCR amount is, and the lower the reference density, the higher the UCR amount is).

FIGS. 10A and 10B are diagrams each representing the UCR amount in accordance with the distance from the reference pixel in the area in the enlarged view 501 and in the enlarged view 511 shown in FIGS. 5A and 5B, respectively. As in FIGS. 7A and 7B to FIGS. 9A and 9B, the dark gray portion indicates that the UCR amount is 100% and the white portion indicates that the UCR amount is 0%. Both in FIG. 10A and in FIG. 10B, the UCR amount of the portion close to the edge is high and the more distant from the edge, the lower the UCR amount becomes.

Figure 11B:
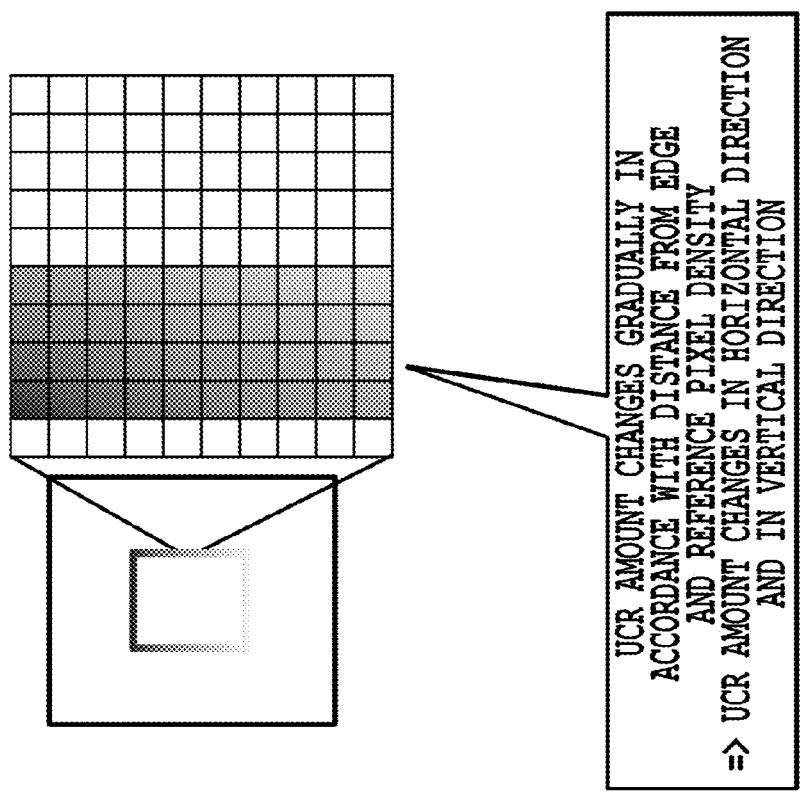
FIGS. 11A and 11B are diagrams each showing a final UCR amount.
Figure 11A:
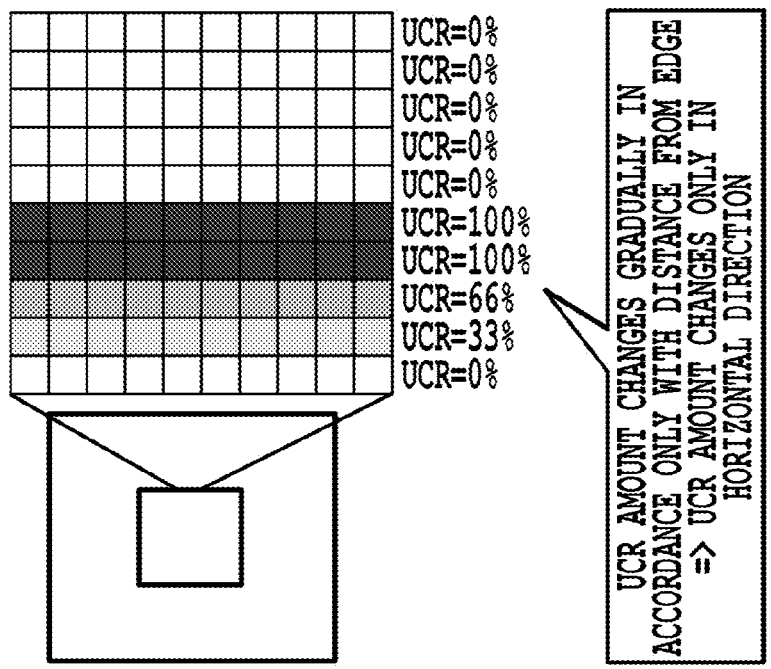
Figure 12:
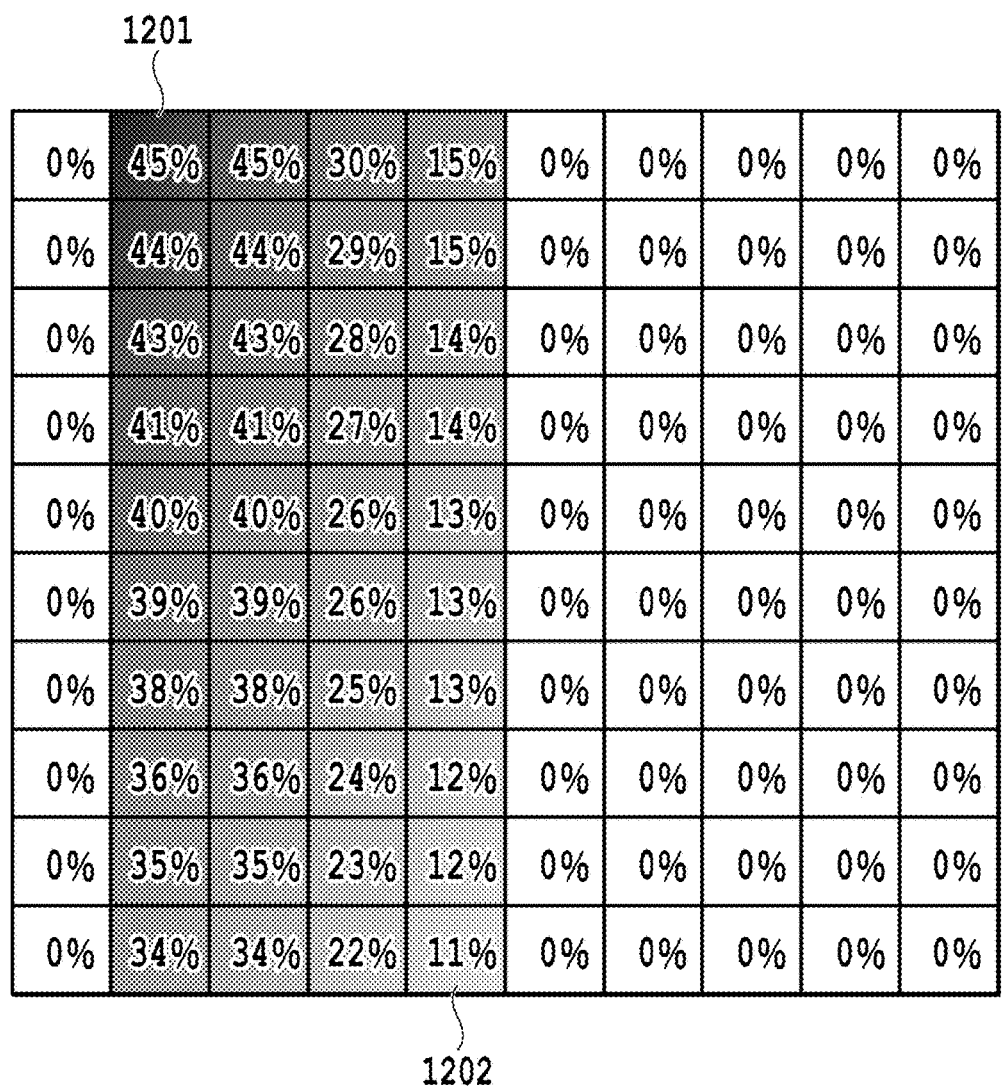
FIG. 12 is a diagram showing a UCR amount of each pixel in FIG. 11B.

FIGS. 11A and 11B are diagrams each representing the final UCR amount in the area in the enlarged view 501 and in the enlarged view 511 shown in FIGS. 5A and 5B, respectively. The final UCR amount is obtained by multiplying the minimum value of the three UCR amounts described above, i.e., the UCR amount in accordance with the density of the pixel of interest (FIGS. 7A and 7B), the UCR amount in accordance with the saturation of the pixel of interest (FIGS. 8A and 8B), and the UCR amount in accordance with the density of the reference pixel (FIGS. 9A and 9B), by the UCR amount in accordance with the distance from the reference pixel (FIGS. 10A and 10B). In FIG. 11A, it is known that the UCR amount that gradually changes in the horizontal direction (the UCR amount decreases stepwise from 100% to 66%, 33%, and 0% as the distance from the edge becomes greater) is set. This results from that the UCR amount changes gradually in accordance only with the distance from the edge. On the other hand, in FIG. 11B, it is known that the UCR amount that gradually changes both in the vertical direction and in the horizontal direction is set. FIG. 12 shows the UCR amount of each pixel in FIG. 11B. Within the area shown in gray, the UCR amount of a pixel 1201 in the top-left corner is the highest, i.e., 45%, and the UCR amount of a pixel 1202 in the bottom-right corner is the lowest, i.e., 11%. Then, it is known that the UCR amount decreases stepwise both in the rightward direction and in the downward direction with the top-left corner as a reference. This results from that the UCR amount changes gradually in accordance with both the distance from the edge and the density of the reference image.

As above, according to the present embodiment, it is possible to perform the stepwise UCR processing in which a difference in step is inconspicuous on the edge pixel in the gray object within the bitmap image.

In the present embodiment, the size of the predetermined area that is used in the edge determination processing is assumed to be 9×9 pixels, the pixels located in the positions whose distance from the edge boundary is four pixels or less on both the left side and the right side are extracted as the edge pixel, and the UCR processing is performed on the edge pixels corresponding to the four extracted pixels. Here, a case is considered where the UCR processing is performed on the edge pixels located in the positions whose distance from the edge boundary is, for example, three pixels or less both on the left side and on the right side. In this case, two methods can be considered. One of the two methods is a method for extracting the pixels located in the positions whose distance from the edge boundary is three pixels or less both on the left side and on the right side from the beginning by changing the size of the predetermined area into 7×7 pixels. Then, in the LUT shown in FIG. 3D that specifies the UCR amount in accordance with the distance from the edge, the UCR amount in accordance with the distance value in the case where the distance value is within ±3 for each of the X coordinate and the Y coordinate is specified as a result. With the method in which the size of the predetermined area is changed into a small size as described above, there is a drawback in that the accuracy of extraction of the edge pixel is also reduced. Because of this, in the case where it is desired to narrow the area of the edge pixel on which the UCR processing is to be performed, it is desirable to keep the size of the predetermined area as it is and to make adjustment in the LUT that specifies the UCR amount in accordance with the distance from the edge. For example, it is recommended to keep the size of the predetermined area at 9×9 pixels and to create and use an LUT in which the distance value is substantially within ±3 by setting the UCR amount to 0% for the portions whose distance value is ±4 in the LUT shown in FIG. 3D.

Further, step 205 (processing to determine the UCR amount in accordance with the degree of achromaticity of the pixel of interest) in the flowchart showing the flow of the UCR processing shown in FIG. 2 is not limited to the method described previously. For example, it is also possible to implement step 205 by a method that makes use of an LUT for estimating the value of each of CMY from the value of K for the pixel values of CMYK output at the time of inputting the pixel value of gray (0≤R=G=B≤255) in the output color processing unit 113. FIG. 3F is a diagram showing an example of the LUT for estimating the CMY values from the K value. In the case of this method, first, the UCR processing unit 114 finds the C value, the M value, and the Y value (estimated CMY values) that are estimated from the K value of the input CMYK values by using the LUT shown in FIG. 3F. Then, a difference between each of the estimated CMY values that are found and the corresponding one of the actual input CMY values is found and the maximum value of the three differences that are found is obtained. Finally, the UCR amount in accordance with the degree of achromaticity of the pixel of interest is determined by using a table (LUT as shown in FIG. 3B described previously) in which the maximum value of the obtained differences and the UCR amount are associated with each other. Here, the case where the pixel values of the pixel of interest are (C:M:Y:K=120:100:60:256) is explained as an example. First, from the input K value, the estimated CMY values (C:M:Y=128:96:48) are obtained by referring to the LUT in FIG. 3F. A difference between each of the estimated CMY values that are found and the corresponding one of the actual input CMY values is found as follows: $\Delta C=8$, $\Delta M=4$, and $\Delta Y=12$. In this case, the maximum value of the differences is "12". Then, the UCR amount in accordance with the degree of achromaticity of the pixel of interest corresponding to the case where the maximum value of the differences is "12" is determined to be 80% from the table in FIG. 3B. By using the method such as this, it is possible to determine the UCR amount in accordance with an appropriate degree of achromaticity even in the case where gray (R=G=B), whose CMY values are not equal, is output by using the table of the output color processing unit 113.

Further, in the present embodiment, the LUT is used for the derivation of each UCR amount (rate0, rate1, rate2, rate3) at steps 204 to 207 described above, but it may also be possible to find the above-described four kinds of UCR amounts by using an arithmetic or conditional expression in place of the LUT. As an example of this, it may also be possible to determine the UCR amount in accordance with the density of the reference pixel so that, for example, the UCR amount is determined to be 100% in the case where the maximum value of the CMYK values of the reference pixel is equal to or less than a certain threshold value or the UCR amount is determined to be 0% in the case where the maximum value is more than the threshold value. Alternatively, it may also be possible to determine the UCR amount to be 0% in the case where the maximum value of the CMYK values of the reference pixel is equal to or more than a certain threshold value or to determine the UCR amount to be 100% in the case where the maximum value is equal to or less than another threshold value, or to determine the UCR amount so as to linearly connect the two UCR amounts in the case where the maximum value is between the two threshold values.

Further, in the present embodiment, at the time of determining the final UCR amount from the above-described four kinds of UCR amounts, the minimum URC amount of the three UCR amounts (rate0, rate1, rate2) is multiplied by the UCR amount (rate3) determined at step 207 as shown by expression (1). Instead of this, it may also be possible to determine, for example, the product of the above-described four UCR amounts to be the final UCR amount, or to determine the minimum value of the above-described four UCR amounts to be the final UCR amount.

As above, according to the present embodiment, by determining the degree (UCR amount) in which the processing to monochromatize into black is performed in accordance with the distance from the reference pixel (different color pixel closest to the pixel of interest), the stepwise processing to monochromatize into black in which a difference in step is not conspicuous is enabled.

Further, by reducing the UCR amount in the case where the density of the reference pixel is high, it is possible to prevent a white spot from occurring between the pixel of interest (e.g., dark gray) and the reference pixel (e.g., dark magenta pixel existing in the vicinity of the pixel of interest).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to suppress a deterioration in image quality accompanying the processing to monochromatize bitmap image data into black.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-239853, filed Nov. 27, 2014, which is hereby incorporated by reference wherein in its entirety.

What is claimed is:

1. An image processing apparatus that monochromatizes a gray pixel included in bitmap image data into a black pixel, the image processing apparatus comprising:
at least one of a processor configured to implement instructions stored in a memory device or an integrated circuit that executes:
a detection task that determines whether or not a pixel of interest in the bitmap image data is a pixel constituting an edge, and detects a neighboring pixel whose color is different from that of the pixel of interest and that exists in the vicinity of the pixel of interest that has been determined to be the pixel constituting the edge; and
a determination task that determines an amount of processing to monochromatize the pixel of interest into black based on a distance from the detected neighboring pixel,
wherein the shorter the distance from the detected neighboring pixel, the higher the amount of processing to monochromatize the pixel of interest into black, and
wherein the amount of processing is an Under Color Removal (UCR) amount in terms of a percentage for monochromatizing the pixel of interest into black.

2. The image processing apparatus according to claim 1, wherein the detection task determines, within a predetermined area with the pixel of interest as a center, the pixel of interest to be a pixel constituting an edge in a case where the number of pixels whose color is the same as that of the pixel of interest is larger than a first predetermined threshold value, the number of pixels whose color is similar to that of the pixel of interest is smaller than a second predetermined threshold value, and the number of pixels whose color is different from that of the pixel of interest is larger than a third predetermined threshold value, and detects the neighboring pixel within the predetermined area.

3. An image processing apparatus comprising:
at least one of a processor configured to implement instructions stored in a memory device or an integrated circuit that executes:
a detection task that detects, in an image including pixels having at least C, M, and Y color components, another color pixel that exists in the vicinity of a pixel of interest, which is an achromatic color including the C, M, and Y color components, the another color pixel having a value of at least one color component that is different, by a predetermined value or more, from a value of at least one color component among the C, M, and Y color components of the pixel of interest;
a determination task that determines an amount for decreasing values of the C, M, and Y color components of the pixel of interest based on a position of the another color pixel detected by the detection task; and
a processing task that perform Under Color Removal (UCR) processing for the pixel of interest based on the amount for decreasing values of the C, M, and Y color components determined by the determination task,
wherein the smaller the number of pixels existing between the detected another color pixel and the pixel of interest is, the larger the amount for decreasing the values of the C, M, and Y color components of the pixel of interest becomes, and
wherein the UCR processing decreases the values of the C, M, and Y color components of the pixel of interest and adds or increases a value of a K component of the pixel of interest.

4. The image processing apparatus according to claim 3, wherein the pixel of interest, which has the number of pixels existing between the detected another color pixel and the pixel of interest is equal to or less than a threshold value and which is processed by the processing task, has pixel values where C=M=Y=0.

5. An image processing method comprising the steps of:
detecting, in an image including pixels having at least C, M, and Y color components, another color pixel that exists in the vicinity of a pixel of interest, which is an achromatic color including the C, M, and Y color components, the another color pixel having a value of at least one color component that is different, by a predetermined value or more, from a value of at least one color component among the C, M, and Y color components of the pixel of interest;
determining an amount for decreasing values of the C, M, and Y color components of the pixel of interest based on a position of the another color pixel detected in the detection step; and
performing Under Color Removal (UCR) processing for the pixel of interest based on the amount for decreasing the values of the C, M, and Y color components determined in the determining step, wherein the smaller the number of pixels existing between the detected another color pixel and the pixel of interest is, the larger the amount for decreasing the values of the C, M, and Y color components of the pixel of interest becomes, and wherein the UCR processing decreases the values of the C, M, and Y color components of the pixel of interest and adds or increases a value of a K component of the pixel of interest.

6. An image processing apparatus comprising:

at least one of a processor configured to implement instructions stored in a memory device or an integrated circuit that executes:

a detection task that detects, in an image including pixels having at least C, M, and Y color components, another color pixel that exists in the vicinity of a pixel of interest, which is an achromatic color including the C, M, and Y color components, the another color pixel having a value of at least one color component that is different, by a predetermined value or more, from a value of at least one color component among the C, M, and Y color components of the pixel of interest;

a determination task that determines an amount for decreasing values of the C, M, and Y color components of the pixel of interest based on values of the C, M, and Y color components of the another color pixel detected by the detection task; and a processing task that perform Under Color Removal (UCR) processing for the pixel of interest based on the amount for decreasing the values of the C, M, and Y color components determined by the determination task, wherein, in a case where a value of a color component of the detected another color pixel is equal to or less than a predetermined value, the higher the value of the color component of the detected another color pixel is, the smaller the amount for decreasing the values of the C, M, and Y color components becomes, and wherein the UCR processing decreases the values of the C, M, and Y color components of the pixel of interest and adds or increases a value of a K component of the pixel of interest.

7. The image processing apparatus according to claim 6, wherein, in a case where at least one value of the C, M, and Y color components of the detected another color pixel is equal to or greater than a predetermined value, the amount for decreasing the values of the C, M, and Y color components is zero.

8. An image processing method comprising the steps of:

detecting, in an image including pixels having at least C, M, and Y color components, another color pixel that exists in the vicinity of a pixel of interest, which is an achromatic color including the C, M, and Y color components, the another color pixel having a value of at least one color component that is different, by a predetermined value or more, from a value of at least one color component among the C, M, and Y color components in the pixel of interest;

determining an amount for decreasing values of the C, M, and Y color components of the pixel of interest based on values of the C, M, and Y color components of the another color pixel detected in the detecting step; and performing Under Color Removal (UCR) processing for the pixel of interest based on the amount for decreasing the values of the C, M, and Y color components determined in the determining step, wherein, in a case where a value of a color component of the detected another color pixel is equal to or less than a predetermined value, the higher the value of the color component of the detected another color pixel is, the smaller the amount for decreasing the values of the C, M, and Y color components becomes, and wherein the UCR processing decreases the values of C, M, and Y color components of the pixel of interest and adds or increases a value of a K component of the pixel of interest.

9. The image processing method according to claim 8, wherein, in a case where at least one value of the C, M, and Y color components of the detected another color pixel is equal to or greater than a predetermined value, the amount for decreasing the values of the C, M, and Y color components is zero.

10. A non-transitory computer readable storage medium storing a program executable by a computer to perform an image processing method comprising the steps of:

detecting, in an image including pixels having at least C, M, and Y color components, another color pixel that exists in the vicinity of a pixel of interest, which is achromatic color including the C, M, and Y color components, the another color pixel having a value of at least one color component that is different, by a predetermined value or more, from a value of at least one color component among the C, M, and Y color components of the pixel of interest;

determining an amount for decreasing values of the C, M, and Y color components of the pixel of interest based on values of the C, M, and Y color components of the another color pixel detected in the detecting step; and performing Under Color Removal (UCR) processing for the pixel of interest based on the amount for decreasing the values of the C, M, and Y color components determined in the determining step, wherein, in a case where a value of a color component of the detected another color pixel is equal to or less than a predetermined value, the higher the value of the color component of the detected another color pixel is, the smaller the amount for decreasing the values of the C, M, and Y color components becomes, and wherein the UCR processing decreases the values of the C, M, and Y color components of the pixel of interest and adds or increases a value of a K component of the pixel of interest.

* * * * *